United States Patent
Emerson et al.

(10) Patent No.: US 7,379,031 B2
(45) Date of Patent: May 27, 2008

(54) GENERATING POINTER POSITION DATA FROM POSITION DATA OF A POINTING DEVICE OF A REMOTE CONSOLE

(75) Inventors: Theodore F. Emerson, Houston, TX (US); Christopher J. Frantz, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 510 days.

(21) Appl. No.: 10/715,960

(22) Filed: Nov. 18, 2003

(65) Prior Publication Data

US 2005/0104852 A1  May 19, 2005

(51) Int. Cl.
*G09G 5/00* (2006.01)
(52) U.S. Cl. .................. 345/2.1; 345/1.1; 345/163; 345/169; 345/173; 710/100; 709/203; 709/217; 709/229; 709/232
(58) Field of Classification Search ............... 345/162, 345/146, 163, 2.1, 2.2, 156, 157, 173; 710/100
See application file for complete search history.

(56) References Cited

U.S. PATENT DOCUMENTS

| 6,098,143 | A | 8/2000 | Humpherys et al. |
| 6,385,682 | B1 | 5/2002 | Emerson et al. |
| 6,476,854 | B1 | 11/2002 | Emerson et al. |
| 6,636,929 | B1 | 10/2003 | Frantz et al. |
| 2002/0083098 | A1* | 6/2002 | Nakamura .................. 707/513 |
| 2005/0007344 | A1* | 1/2005 | Cook et al. ................. 345/163 |
| 2005/0138215 | A1* | 6/2005 | Tjong et al. ................ 709/250 |

OTHER PUBLICATIONS

Compaq Computer Corporation, "Technology Brief: Integrated Lights-Out Technology: Enhancing the Manageability of ProLiant Servers," pp. 1-12 (2002).
Hewlett-Packard Company, "Integrated Lights-Out Advanced: key benefits," printed from http://www.hp.com, pp. 1-2 (2002).
Hewlett-Packard Company, "Integrated Lights-Out Advanced: product overview," printed from http://www.hp.com, pp. 1-2 (2002).
Hewlett-Packard Company, "Remote Insight Lights-Out Edition II," printed from http://www.hp.com, pp. 1-3 (dated as least as early as Apr. 2, 2003).
Hewlett-Packard Company, "Remote Insight Lights-Out Edition" printed from http://www.hp.com, pp. 1-3 (dated at least as early as Apr. 2, 2003).
USB Implementers' Forum, "Universal Serial Bus (USB): Device Class Definition for Human Interface Devices (HID)," Firmware Specification-Jun. 27, 2001, Version 1.11, pp. 1-84 (2001).

* cited by examiner

*Primary Examiner*—Richard Hjerpe
*Assistant Examiner*—Jennifer T Nguyen

(57) ABSTRACT

A method and apparatus of remotely accessing a computer system by a remote console includes receiving, by an emulation device, pointer position data representing a position of a first pointing device of the remote console. The emulation device emulates a second pointing device that is of a different type than the first pointing device. The emulation device generates data representing a position of the second pointing device based on the received pointer position data representing the position of the first pointing device.

29 Claims, 3 Drawing Sheets

GENERATING POINTER POSITION DATA FROM POSITION DATA OF A POINTING DEVICE OF A REMOTE CONSOLE

BACKGROUND

Server computer systems are utilized to provide, among other uses, computing resources for software applications and storage repositories for data. System administrators perform maintenance and upkeep of the server's hardware and software. System administrators may access the server by using a display device, a keyboard, and a pointing device connected to the server.

Graphical-user-interface (GUI) based software applications executing on the server may be used by system administrators to perform maintenance and upkeep of the server hardware and software. Each software application GUI generally allows input and interaction with the software application using the keyboard and pointing device.

Alternatively, in a KVM (keyboard video monitor) arrangement, a display device, keyboard, and mouse are connected to a server management device, which in turn is connected to one or more ports of the server. A system administrator can access the server through the use of the display device, keyboard, and mouse connected to the server management device.

Remote management consoles such as a computer system or personal digital assistant (PDA) may also be used to remotely access and administer servers. Remote management consoles may be connected to the server management device to allow a system administrator to remotely access a server or one server in a group of servers and monitor the status of or administer the server from a remote location. Access to the server may be through dedicated dial-in to the server management device, or by using the world wide web (WWW) via a local area network (LAN) connection, wide area network (WAN) connection or dial-up service to an Internet service provider (ISP) for connection to the server management device.

Remote management consoles may have a pointing device such as a mouse that along with a GUI allows interaction with the server management device. The GUI may be displayed in a WWW browser such as Internet Explorer® or Netscape Navigator®. Software executing on the server may be available to the system administrator through the GUI on the remote management console. Thus, the GUI in the remote management console may allow the system administrator to view software as if the system administrator was in front of the actual server display screen. The administrator may use the keyboard and pointing device of the remote management console to interact with software running on the server.

One issue with using a pointing device of the remote management console to interact with the server is lack of pointer synchronization. Mis-synchronization is primarily due to the inexact nature of pointing devices such as a mouse. A mouse typically signals relative movement to an operating system executing on the computer system to which the mouse is attached. The operating system interprets this data according to various user settings and changes the position of the pointer on the GUI of the computer system display screen. However, when the output signals from the mouse of the remote management console are also directed to the server through the server management device, the operating systems on the remote management console and server may interpret the output signals differently. This difference in interpreting the mouse output signals is because each operating system may have different settings for mouse sensitivity, acceleration, and so forth. Since the operating system of the remote management console and server may transform the relative movement of the mouse into different pointer display coordinates, the pointer within the two GUIs may no longer be synchronized.

In addition, the server may re-position the pointer based on user specified settings. For example, if the user configures the server operating system to move the pointer to the "OK" button when a pop-up dialog box is displayed, the remote management console may not be communicated this change to adjust its pointer. Although additional software could be employed on the server to communicate pointer changes back to the remote management console, this technique requires additional software to be installed on every managed server. Additionally, such software may not be present during operating system initialization or installation. Thus, it is difficult for the pointer position on the remote management console to remain synchronized to the pointer position on the server.

Server management devices typically perform input redirection by creating a virtual input device that may temporarily replace or enhance an input device of the server. This virtual device typically is designed to model the input device used on the remote management console by presenting the same device to the server thus redirecting the input device from the remote management console to the server.

SUMMARY

In general, according to one embodiment, a method of remotely accessing a computer system by a remote console includes receiving, by an emulation device, first pointer position data representing a position of a first pointing device coupled to the remote console. The emulation device emulates a second pointing device that is of a different type than the first pointing device. The emulation device generates second pointer position data representing a position of the second pointing device based on the received first pointer position data.

Other or alternative features will become apparent from the following description, from the drawings, and from the claims.

DETAILED DESCRIPTION

Figure 1:
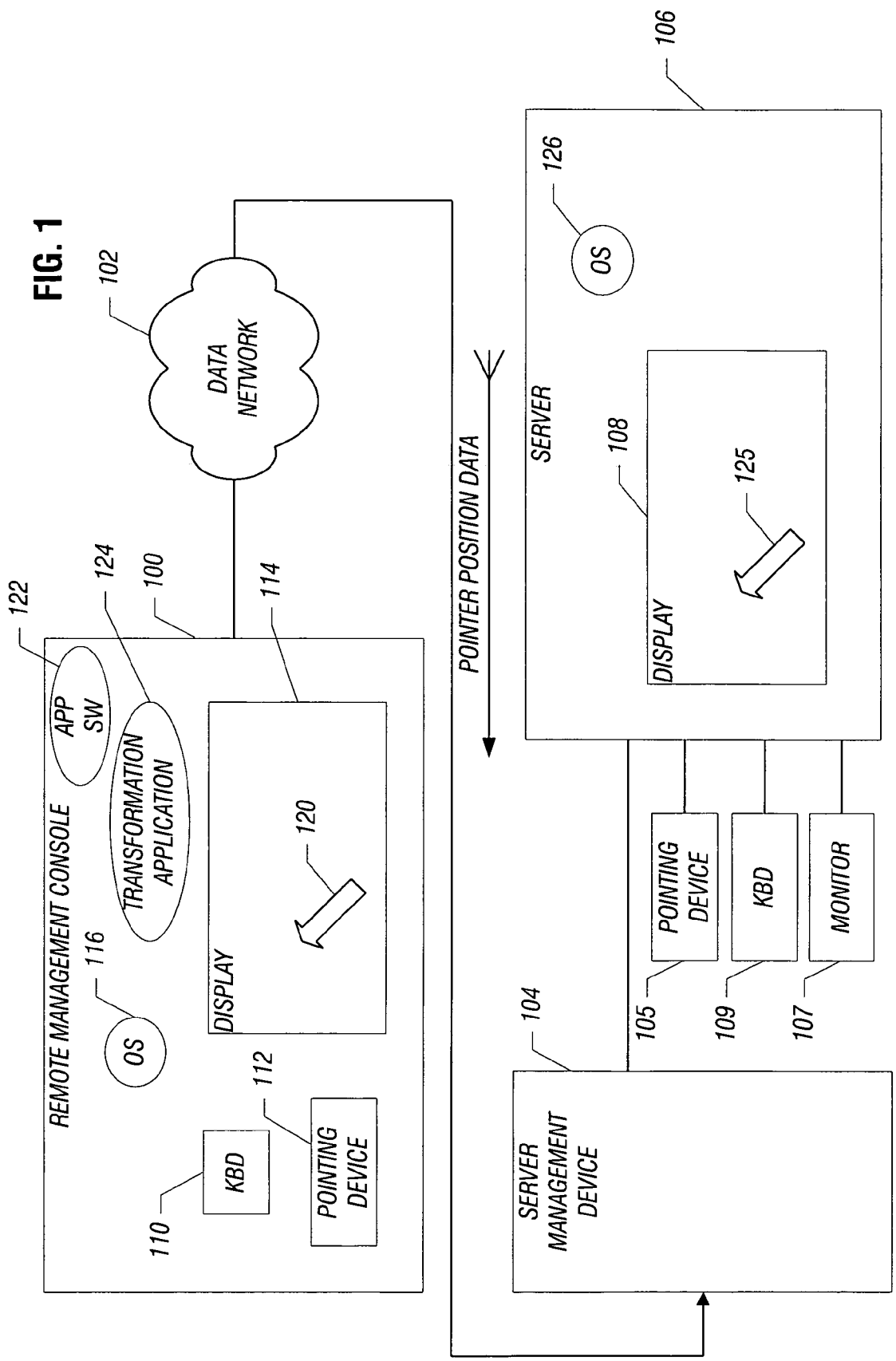
FIG. 1 is a block diagram of an example arrangement that includes a remote management console, a server management device, and a server, in accordance with an embodiment.

FIG. 1 illustrates an example arrangement in which a remote management console 100 is coupled over a network 102 to a server management device 104 to enable an administrator at the remote management console 100 to manage the status of or to administer a server 106. The server 106 is coupled to the server management device 104. Alternatively, the server management device 104 can be part of the server 106. Administrators can locally use a pointing device 105 (e.g., a mouse), a keyboard 109, and a monitor 107 that are connected to the server 106 to perform administrative tasks with respect to the server 106. A display 108 (which includes a pointer or cursor 125) of the server 106 can be displayed on the monitor 107. As used here, the term "display" refers to the display data that is stored or generated in a computer system, such as the server 106. The display is converted to output signals sent to a monitor where the display is presented. Note that the pointing device 105, keyboard 109, and monitor 107 are optional devices that are not connected to the server 106 in some arrangements.

In an alternative arrangement, a pointing device, keyboard, and monitor can be connected to the server management device 104 for enabling access to the server 106.

In accordance with some embodiments, if an administrator is at a location that is remote from the server 106, the administrator can perform administrative tasks with respect to the server 106 by using the remote management console 100. Although only one remote management console is shown in FIG. 1, more than one remote management console can be coupled to the server management device 104 over the data network 102. Examples of the data network 102 include a local area network (LAN), a wide area network (WAN), or a public network such as the Internet. In another embodiment, instead of the data network 102, another type of link can be used to couple the remote management console 100 to the server management device 104, such as a dial-in connection.

Examples of the remote management console 100 include a personal digital assistant (PDA), packet network-enabled mobile phone, or any other device capable of establishing a communication session with the server management device 104 and displaying a graphical user interface (GUI). The GUI displayed may be the GUI of a browser or other application. The remote management console 100 includes various input devices, such as a keyboard or keypad 110, a pointing device 112 (e.g., a mouse, touchpad, trackball, tablet, touch screen, and so forth), and a display 114. Although not shown, the display 114 is presented for output on a monitor, liquid crystal display (LCD), or any other appropriate display device.

A pointing device such as a mouse, touchpad, or trackball is a relative pointing device. With a relative pointing device, movement of the pointing device 112 is indicated by a change in position (relative pointer position data) to an operating system 116 of the remote management console 100. The relative pointer position data according to some implementations is in the form of relative pointing device coordinates. "Movement of a pointing device" refers to movement of a mouse, movement of a user's finger over a touchpad, rotation of a trackball, and any other actuation of a pointing device that indicates that a corresponding pointer or cursor 120 displayed by the display 114 of the remote management console 100 is to be moved. As used here, the term "pointing device" refers to a device that receives an indication of user actuation (such as movement of a mouse or trackball or movement of a user's finger over a touchpad) as well as any control logic that provides an indication of movement in response to the indication of user actuation. "Pointing device" is intended to cover either an actual pointing device or a virtual or emulated pointing device.

The operating system 116 of the remote management console 100 transforms the relative pointer position data provided by the relative pointing device 112 into absolute pointer position data (such as absolute pointing device coordinates) to represent the position of the cursor 120 in the display 114. The absolute pointer position data is communicated to an application software 122 running in the remote management console 100. The operating system 116 adjusts the position of the cursor 120 in the display 114 based on the absolute pointer position data. As used here, "absolute pointer position data" refers to data that indicates a position of a pointer or cursor in a grid of predefined size. Absolute pointer position data is distinguished from relative pointer position data in that relative pointer position data indicates change of position from a previous position, rather than a specific or absolute position within a predefined grid.

An issue associated with remote access of the server 106 by the remote management console 100 is that the operating system 116 of the remote management console 100 and an operating system 126 of the server 106 may interpret movement of the pointing device 112 differently in response to relative position coordinates from the pointing device 112. Typically, an operating system has various settings with respect to pointing devices, such as sensitivity, acceleration, and other settings. Different settings may cause movement of a pointing device to be interpreted differently by the remote management console 100 and the server 106, which may cause pointer mis-synchronization to occur if relative pointer position data is simply communicated from the remote management console 100 to the server 106 through the server management device 104.

Alternatively, the application software 122 may not have direct access to the relative movement of the mouse signals due to abstraction in the operating system 116 of the remote management console 100. In this case, the application software 122 derives the relative movement data by measuring pointer displacement with respect to an update interval (by computing a derivative of displacement data with respect to time). In both cases, relative pointer position data is either directly received by the pointing device 112 or derived by the application software 122.

To address the mis-synchronization issue, in accordance with some embodiments of the invention, the server management device 104 enables accurate positioning of a cursor 125 in the display 108 of the server 106 in response to movement of the pointing device 112 at the remote management console 100. The server management device 104 accomplishes the accurate positioning of the cursor 125 by emulating a pointing device that is of a different "type" from the pointing device 112. The pointing device emulated by the server management device 104 is one that provides absolute pointer position data in response to pointing device actuation. Two pointing devices are of different "types" if they are different kinds of devices (such as a keyboard and mouse, a tablet and mouse, and so forth). A pointing device that is capable of operating in different modes can also be considered to be of different types. Thus, the pointing device operating in a first mode can be considered to be of a different type from the pointing device operating in a second mode. One specific example of pointing devices that operate in different modes are Universal Serial Bus (USB) human interface devices (HIDs) specified by the *Universal Serial Bus (USB) Device Class Definition for Human Interface Devices (HID. Version* 1.11. For example, an HID can operate in the mouse mode or in a tablet mode.

The server management device 104 presents an input device to the operating system 126 of the server 106. In one implementation, the input device presented by the server management device 104 is a USB HID. In accordance with some embodiments of the invention, the server management device 104 emulates a tablet or touch screen. A "tablet" or "touch screen" refers to any input device in which a user touches (either with the user's finger or a stylus or other like device) a screen or other template to indicate movement of a cursor in a display. A feature of a tablet or touch screen is that movement is reported as absolute coordinates to the operating system of the system to which the tablet or touch screen is coupled. In this case, the emulated tablet or touch screen is coupled to the server 106. In the ensuing discussion, reference is made to "tablet device" to refer to a tablet, touch screen, or any other input device where cursor position is indicated by a user's finger or stylus.

Thus, according to some embodiments of the invention, movement of the pointing device 112 in the remote management console 100 is indicated by absolute pointer position data communicated from the remote management console 100 to the server management device 104 over the data network 102. In some embodiments, the pointer position data is communicated in Internet Protocol (IP) packets to the server management device 104. The absolute pointer position data is generated by the operating system 116 of the remote management console 100 based on the relative pointer position data from the remote pointing device 112.

In response to the absolute pointer position data from the remote management console 100, the server management device 104, which emulates a tablet device, also sends absolute pointer position data to the operating system 126 of the server 106. This process, described in further detail below, enables accurate positioning of the cursor 125 in the display 108 of the server 106.

According to one embodiment, the server management device 104 is coupled to one or more ports of the server 106, such as a USB port, a Peripheral Component Interconnect (PCI) port, and one or more PS/2 ports (as examples).

Since the server management device 104 is emulating a tablet device, the server management device 104 informs the operating system 126 of the server 106 of the size and other characteristics of the tablet device. For example, the size of the tablet device may be represented as a grid of 3000 millimeters (mm) by 3000 mm (or some other arbitrary size). Absolute pointer position data provided by the server management device 104 to the operating system 126 of the server 106 indicates a position in the grid that makes up the emulated tablet device. The position in the tablet device grid is provided to the operating system 126 in response to pointer position data received from the remote management console 100.

If transformation or scaling of the pointer position data generated by the operating system 116 of the remote management console 100 to pointer position data that represents a location in the tablet device grid is to be performed, then the transformation or scaling is performed by the transformation application 124 (or other designated component) in the remote management console 100. In one implementation, the transformation application 124 can be implemented as a JAVA module, although other types of modules can be used in other embodiments. The transformation application 124 has access to information (stored in the remote management console 100) that indicates the size of the tablet device being emulated by the server management device 104. The transformation application 124 receives absolute pointer position data from the operating system 116 in the remote management console 100 and transforms or scales the received pointer position data into pointer position data of the emulated tablet device. Instead of performing the transformation in the remote management console 100, the transformation of pointer position data generated by the operating system 116 of the remote management console 100 can be performed by the server management device 104.

The transformed pointer position data is sent by the server management device 104 to the operating system 126 of the server 106.

Thus, according to some embodiments of the invention, to enable accurate positioning of a pointer based on movement of a remote pointing device (at a remote console), a computer system includes an emulation device (such as the server management device 104 discussed above) that emulates a second pointing device that is of a different type from the remote pointing device. The computer system receives pointer position data from the remote console, and in response to the received pointer position data, the emulation device provides pointer position data to software running in the computer system. In one embodiment, the remote pointing device is a relative pointing device that communicates a change of position using relative pointer position data. The relative pointer position data is transformed to absolute pointer position data, which is provided to the emulation device. The emulation device then provides absolute pointer position data to software in the computer system, which accurately positions a pointer or cursor in a display of the computer system. In this way, synchronized and accurate pointer movement control can be achieved between the remote console and the computer system.

Figure 2:
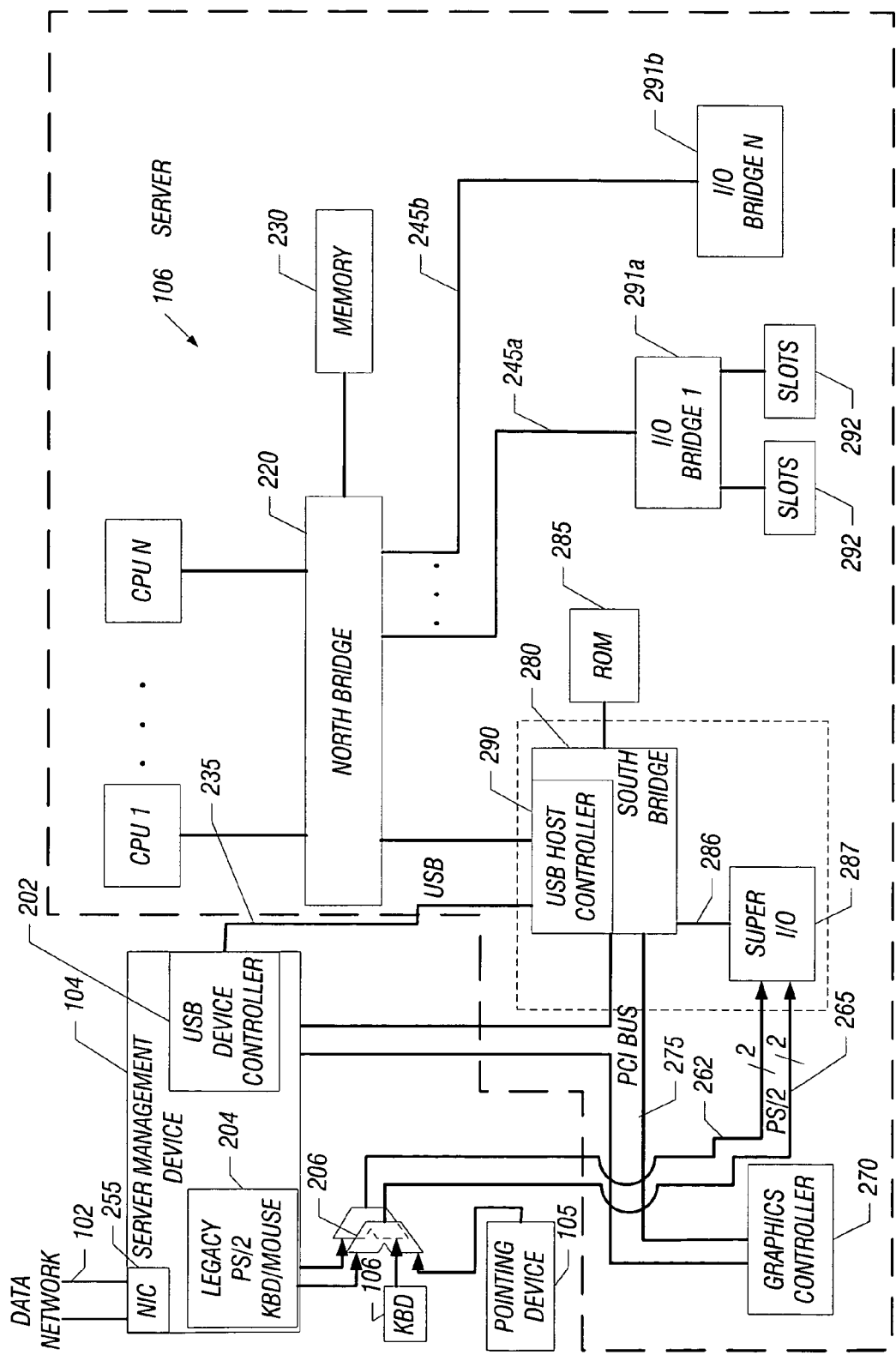
FIG. 2 is a block diagram of a server coupled to a server management device, in accordance with an embodiment.

Referring to FIG. 2, according to an example arrangement, the server 106 may include one or more central processing units (CPU1-CPUN), one or more memory devices 230, and a bridge device such as north bridge 220. The arrangement of the server 106 shown in FIG. 2 is provided for purposes of example, as other embodiments can employ other arrangements of the server 106. The CPUs may be Pentium® architecture, Xeon® architecture, Itanium® architecture, POWERPC® architecture or any other type of CPU. The north bridge 220 may be coupled to one or more input/output bridges 291a, 291b through respective I/O buses 245a, 245b. The I/O bridge 291a is coupled to slots 292 (e.g., PCI slots). The I/O bridge 291b can be coupled to various peripheral devices (not shown).

Additionally, the north bridge 220 can be coupled to another bridge device such as a south bridge 280. The south bridge 280 may be coupled to storage devices, such as a ROM (read-only memory) 285. Additionally, in some embodiments, the south bridge 280 may be coupled to a super input/output (I/O) controller 287. The combination of the south bridge 280 and super I/O controller 287 provides various I/O interface functions. Note that instead of two separate chips to provide the I/O interface functions, one chip or more than two chips can be used in other implementations.

The south bridge 280 includes a USB host controller 290 that is connected to a USB device controller 202 in the server management device 104 through a USB bus 235. The server management device 104 can also be coupled to the server 106 through another type of interface (e.g., PS/2 interface 262, 265, PCI bus 275). A graphics controller 270 is coupled to the south bridge 280 over the PCI bus 275.

The server management device 104 is coupled to, or includes, a communications interface (e.g., a network interface card or NIC 255), which enables the server management device 104 to communicate over the network 102 so that the server management device 104 can receive pointer position data over the network 102.

The server management device also optionally includes a legacy PS/2 keyboard and mouse logic 204 for receiving remote management console PS/2 keyboard and PS/2 relative mouse signals including relative pointer position data over the data network 102 through the NIC 255. The received PS/2 keyboard and relative mouse signals are generated by user interaction with the remote management console 100. The legacy keyboard and mouse logic 204 provides legacy support to enable a conventional mechanism for receiving pointer position data from the remote management console 100.

The legacy keyboard and mouse logic 204 outputs the PS/2 keyboard and PS/2 relative mouse signals to first inputs of multiplexers 206. The second inputs of multiplexers 206 are connected to the keyboard 109 and pointing device 105. The outputs of the multiplexers 206 are connected to the PS/2 keyboard lines 262 and PS/2 mouse lines 265, which are connected to a keyboard controller (not shown) in the super I/O controller 287 of the server 106. The multiplexers 206 select between the first and second inputs to couple one of the keyboard/mouse signals from the legacy keyboard and mouse logic 204 and the keyboard/mouse signals from the keyboard 109 and pointing device 105 for output to the PS/2 interface of the server 106. In one implementation, the multiplexers 206 are separate from the server management device 104. In another implementation, the multiplexers 206 reside within the server management device 104.

Figure 3:
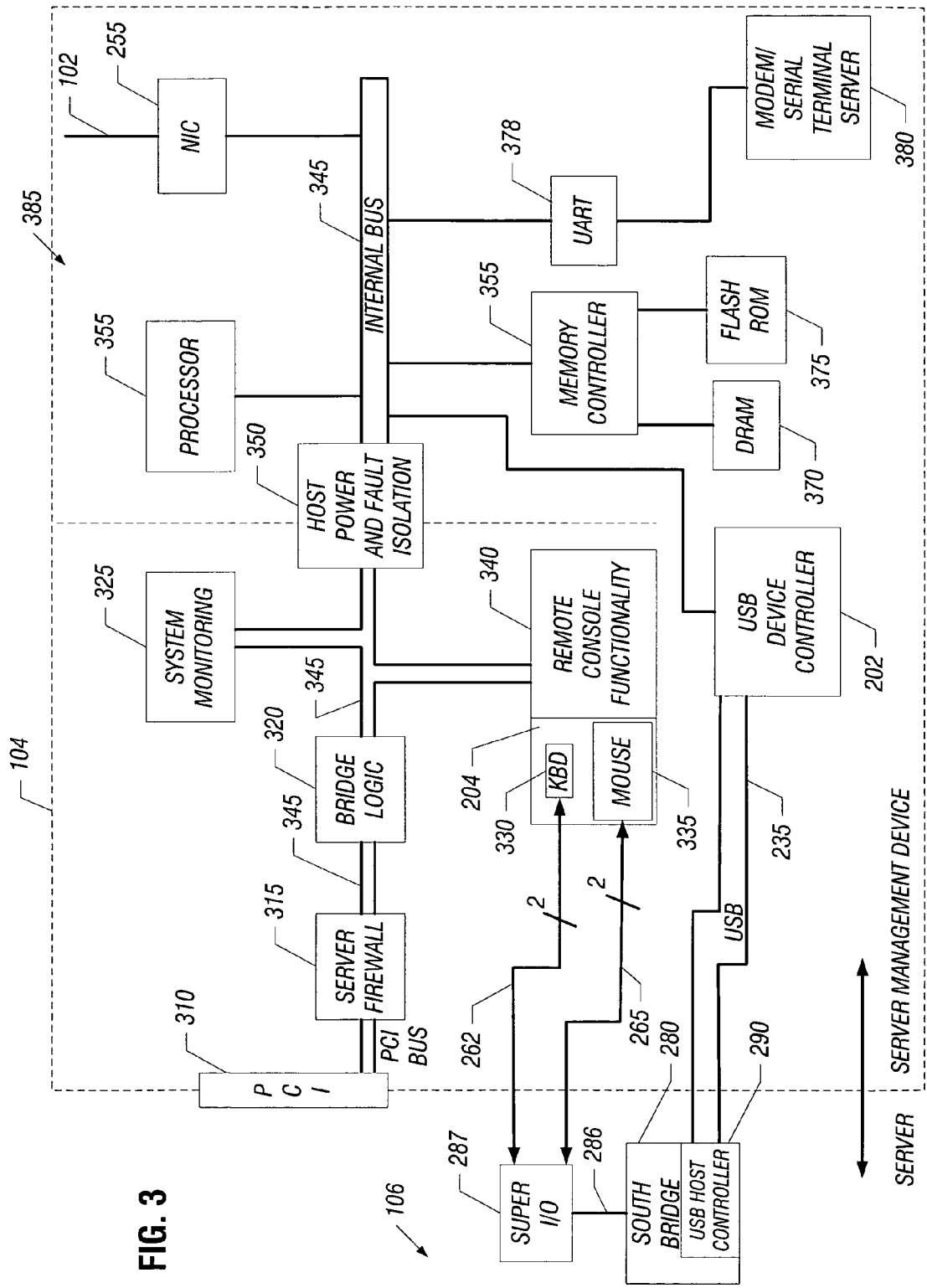
FIG. 3 is a block diagram of a server management device in accordance with some embodiments of the invention coupled to the server of FIG. 2.

Referring to FIG. 3, one example arrangement of the server management device 104 is shown in greater detail. Note that different arrangements of the server management device 104 can be used in other embodiments. The server management device 104 may be implemented in an ASIC (application specific integrated circuit) device or other type of component. The server management device 104 can be mounted on the main circuit board of the server 106, or alternatively, the server management device 104 can be plugged into a slot or port of the server 106. For example, the server management device 104 has a PCI bus connector 310 that can be plugged into the PCI slot 292 of the server 106. The PCI bus connector 310 is coupled to firewall 315 and bridge logic 320 through bus 345, which in some embodiments may be a 32-bit internal bus. Firewall 315 and bridge logic 320 enable a processor 355 of the host management device 104 to isolate and control the flow of information between the host computer system (the server 106) and the server management device 104. The firewall 315 protects against unauthorized access through the PCI bus and shields sensitive information that may be stored in the server management device 104. This sensitive information may be located in a memory 370 (e.g., DRAM) or in non-volatile memory 375 (e.g., FLASH ROM) of server management device 104. Access to the memories 370 and 375 is provided by a memory controller 355.

Host power and fault isolation 350 splits the server management device 104 into two separate areas: a first area that operates under normal host computer system power, and a second area (indicated as 385) that operates under a separate auxiliary power. Server power and fault isolation module 350 monitors the host computer system for any unexpected behavior such as a host computer system power failure. If a power failure occurs, processor 355 in the second area 385 continues to operate normally on auxiliary power. The processor 355 and other components in the second area 385 operating on auxiliary power continue to provide the following services: web browser access, alerts, access to event logs, and so forth.

The processor 355 of the server management device 104 provides the "brains" of the various server management tasks performed by the server management device 104 with respect to the server 106. An operating system (separate from the operating system 126 of the server 106) is executable on the server management device 104.

A system monitoring module 325 is also coupled to PCI bus connector 310 through bus 345 to monitor hot-plug fans, power supplies, environmental sensors, and various other components of the server 106. The system monitoring module 325, in some embodiments, may reboot the server 106 automatically after a recoverable hardware or software fault occurs in the system.

A remote console functionality module 340 enables hardware-based remote management device functions. In some embodiments, the remote console functionality module 340 monitors a bus of the server 106 for video activity so that video information can be captured and transmitted to the remote management console. In addition, the remote console functionality module 340 includes the legacy PS/2 keyboard and mouse logic 204 (FIG. 2). The legacy PS/2 keyboard and mouse logic 204 includes virtual keyboard logic 330 and virtual mouse logic 335 that receive remote management console PS/2 keyboard and PS/2 relative mouse signals over the data network 102 through the NIC 255. The remote management console keyboard and relative mouse signals are received by the processor 355, which controls the virtual keyboard logic 330 and virtual mouse logic 335. The virtual mouse logic 335 in the remote console functionality module 340 provides legacy support to enable a conventional mechanism for receiving pointer position data. The virtual mouse logic 335 receives relative pointer position data rather than absolute pointer position data from the remote management console 100.

According to some embodiments, instead of using the virtual mouse logic 335 to receive relative pointer position data, the USB device controller 202 in the server management device 104 is used to emulate a tablet device to the server 106, as discussed above. The USB device controller 202 receives absolute pointer position data over the data network 102. The USB device controller 202 identifies to the operating system 126 (FIG. 1) of the server 106 that it is coupled to a USB HID, which in this case is the emulated tablet device.

The server management device 104 may also include a universal asynchronous receiver/transmitter (UART) 378 coupled to bus 345. The UART 378 may be connected to a modem/serial terminal server 380 that is capable of dial-in connection and communication with the remote management console 100. Thus, instead of communicating pointer position data through the NIC 255, the server management device 104 can communicate pointer position data through the modem/serial terminal server 380.

In the implementation depicted in FIGS. 2 and 3, the server management device 104 emulates a USB tablet device, which is coupled to a USB host controller (290) in the server 106. In another embodiment, the server management device 104 can emulate both the tablet device and the USB host controller. In this case, a separate USB host controller does not have to be used to perform accurate pointer control in response to position data from the remote management console 100. The server management device 104 in this alternative configuration can send absolute pointer position data to a bus in the server 106 (such as a PCI bus) to communicate the pointer position data to the operating system 126 of the server 106. This alternative arrangement avoids having to send pointer position data in USB signals to the USB host controller.

The various tasks discussed above can be performed by hardware, firmware, or software, or any combination of the above. Firmware and software are executable on a microcontroller, microprocessor, or other control unit. As used here, a "controller" refers to hardware, firmware, software, or a combination thereof. A "controller" can refer to a single component or to plural components (whether software, firmware, or hardware).

Data and instructions of the software and firmware are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the present invention has been described with respect to a limited number of embodiments, those skilled in the art will appreciate numerous modifications and variations there from. It is intended that the appended claims cover all such modifications and variations as fall within the true spirit and scope of this present invention.

What is claimed is:

1. A method of remotely accessing a computer system by a remote console, comprising:
   receiving, by an emulation device that emulates a Universal Serial Bus (USB) human interface device, first pointer position data representing a position of a first pointing device coupled to the remote console, the emulated USB human interface device representing a second pointing deyice that is of a different type than the first pointing device, wherein the first pointer position data is received over a network by the emulation device from the remote console; and
   generating, by the emulation device that emulates the USB human interface device, second pointer position data representing a position of the second pointing device based on the received fast pointer position data,
   wherein receiving the first pointer position data by the emulation device comprises receiving the first pointer position data that is scaled from intermediate position data generated at the remote console, wherein the intermediate position data is generated due to activation of the first pointing device, and wherein scaling the intermediate position data to the first pointer position data is according to size information of the second pointing device.

2. The method of claim 1, further comprising sending the second pointer position data to a software module in the computer system.

3. The method of claim 1, wherein the emulated USB human interface device represents a USB tablet device, and wherein generating the second pointer position data comprises generating pointer position data associated with the USB tablet device.

4. The method of claim 3, wherein the first pointing device comprises a mouse device, and wherein receiving the first pointer position data comprises receiving the first pointer position data representing a position of the mouse device.

5. The method of claim 3, wherein receiving the first pointer position data comprises receiving the first pointer position data representing a position of a pointing device that provides relative pointer position data to indicate movement of the pointing device.

6. The method of claim 5, wherein receiving the first pointer position data comprises receiving absolute pointer position data.

7. The method of claim 6, wherein generating the second pointer position data comprises generating absolute pointer position data.

8. The method of claim 3, wherein generating the second pointer position data comprises generating winter position data representing a position in a grid associated with the USB tablet device.

9. The method of claim 1, further comprising emulating, with the emulation device, a USB host controller that is associated with the emulated USB human interface device.

10. The method of claim 9, further comprising sending the second pointer position data onto a system bus of the computer system.

11. The method of claim 10, wherein sending the second pointer position data onto the system bus comprises sending the second pointer position data onto a Peripheral Component Interconnect (PCI) bus.

12. The method of claim 1, wherein receiving the first pointer position data by tbe emulation device comprises receiving the first pointer position data that is scaled from intermediate position data generated at the remote console, wherein the intermediate position data is generated due to activatiop of the first pointing device, and wherein scaling the intermediate position data to the first pointer position data is according to size information of the second pointing device.

13. The method of claim 1, wherein receiving the first pointer position data at the emulation device comprises receiving the first pointer position data at the emulation device that is connected over a USB bus to a USB controller in the computer system.

14. The method of claim 1, wherein receiving the first pointer position data by the emulation device over the network comprises receiving the first pointer position data by the emulation device over an Internet Protocol network.

15. An apparatus comprising:
    an interface to receive first pointer position data from a remote console over an Internet Protocol (IP) network, the first pointer position data associated with a first pointing device, wherein the first pointer position data is scaled from intermediate position data generated at the remote console due to movement of the first pointing device; and
    a controller to emulate a Universal Serial Bus (USB) human interface device that represents a second pointing device that is of a different type from the first pointing device, the controller to generate second pointer position data in response to the first pointer position data, wherein the scaling of the intermediate position data to the first pointer position data is according to size information of the second pointer device.

16. The apparatus of claim 15, further comprising an operating system, the operating system to receive the second pointer position data.

17. The apparatus of claim 16, further comprising a server, the operating system executable in the server.

18. The apparatus of claim 17, further comprising a server management device including the interface and the controller, the server management device connected over a USB bus to the server.

19. The apparatus of claim 18, wherein the server management device is part of the server.

20. The apparatus of claim 15, wherein the emulated USB human interface device represents a tablet device.

21. The apparatus of claim 20, wherein the first pointer position data represents a position of a mouse device coupled to the remote console.

22. The apparatus of claim 20, wherein the first pointer position data represents a position of a pointing device that provides relative pointer position data to indicate movement of the pointing device.

23. The apparatus of claim 22, wherein the first pointer position data comprises absolute pointer position data.

24. The apparatus of claim 23, wherein the second pointer position data comprises absolute pointer position data.

25. The apparatus of claim 15, further comprising a USB host controller to receive the second pointer position data from the USB human interface device.

26. The apparatus of claim 25, wherein the controller comprises a USB device controller.

27. The apparatus of claim 15, wherein the controller is adapted to further emulate a USB host controller associated with the emulated USB human interface device.

28. A console comprising:
- a first pointing device;
- an interface to communicate first absolute pointer position data to a remote computer system over a network; and
- a controller to transform relative pointer position data from the first pointing device to an intermediate absolute pointer position data, and the controller to further scale the intermediate absolute pointer position data to the first absolute pointer position data based on size information of a Universal Serial Bus (USB) tablet device being emulated by an emulation device connected to the computer system.

29. A system comprising:

means for receiving first pointer position data over a network from a remote console, the first pointer position data representing a position of a mouse device, wherein the first pointer position data is scaled from intermediate position data generated at the remote console due to movement of the mouse device; and means for emulating a Universal Serial Bus (USB) tablet device that is different from the mouse device, the emulating means for generating second pointer position data corresponding to the emulated USB tablet device in response to the first pointer position data, wherein the scaling of the intermediate position data to the first pointer position data is according to size information of the emulated USB tablet device.

* * * * *

UNITED STATES PATENT AND TRADEMARK OFFICE
CERTIFICATE OF CORRECTION

| | | |
|---|---|---|
| PATENT NO. | : 7,379,031 B2 | Page 1 of 1 |
| APPLICATION NO. | : 10/715960 | |
| DATED | : May 27, 2008 | |
| INVENTOR(S) | : Theodore F. Emerson et al. | |

It is certified that error appears in the above-identified patent and that said Letters Patent is hereby corrected as shown below:

In column 9, line 30, in Claim 1, delete "deyice" and insert -- device --, therefor.

In column 9, line 37, in Claim 1, delete "fast" and insert -- first --, therefor.

In column 10, line 5, in Claim 8, delete "winter" and insert -- pointer --, therefor.

In column 10, line 19, in Claim 12, delete "tbe" and insert -- the --, therefor.

In column 10, line 23, in Claim 12, delete "activatiop" and insert -- activation --, therefor.

In column 11, line 15, in Claim 27, delete "controUer" and insert -- controller --, therefor.

In column 11, line 21, in Claim 28, delete "transfonn" and insert -- transform --, therefor.

Signed and Sealed this

Tenth Day of February, 2009

JOHN DOLL
*Acting Director of the United States Patent and Trademark Office*